(12) United States Patent
Scott et al.

(10) Patent No.: US 9,004,528 B2
(45) Date of Patent: Apr. 14, 2015

(54) VEHICLE SEAT ASSEMBLY

(71) Applicant: Ford Global Technologies, LLC, Dearborn, MI (US)

(72) Inventors: Tim Scott, Essex (GB); Markus Koelsch, Cologne (DE); Jim Alcorn, Essex (GB); Tina Sharp, Essex (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/902,353

(22) Filed: May 24, 2013

(65) Prior Publication Data

US 2013/0334798 A1   Dec. 19, 2013

(51) Int. Cl.
*B60R 21/207* (2006.01)
*B60R 21/231* (2011.01)
*B60R 21/2165* (2011.01)

(52) U.S. Cl.
CPC ......... *B60R 21/207* (2013.01); *B60R 21/23138* (2013.01); *B60R 2021/21652* (2013.01)

(58) Field of Classification Search
CPC .................. B60R 21/207; B60R 2021/2076
USPC ............ 280/728.2, 728.3, 730.2; 297/216.13
See application file for complete search history.

(56) References Cited

U.S. PATENT DOCUMENTS

| | | | | |
|---|---|---|---|---|
| 4,834,458 A | * | 5/1989 | Izumida et al. | 297/452.23 |
| 6,106,003 A | * | 8/2000 | Rahmstorf et al. | 280/728.3 |
| 8,075,053 B2 | * | 12/2011 | Tracht et al. | 297/216.13 |
| 8,079,640 B2 | * | 12/2011 | Kim et al. | 297/224 |
| 2004/0130130 A1 | * | 7/2004 | Bossecker et al. | 280/730.2 |
| 2005/0258624 A1 | * | 11/2005 | Abraham et al. | 280/728.3 |
| 2006/0113766 A1 | * | 6/2006 | Tracht et al. | 280/730.2 |
| 2006/0113768 A1 | * | 6/2006 | Tracht et al. | 280/730.2 |
| 2006/0113769 A1 | * | 6/2006 | Tracht | 280/730.2 |
| 2007/0085308 A1 | * | 4/2007 | Tracht et al. | 280/730.2 |
| 2008/0211274 A1 | * | 9/2008 | Tracht et al. | 297/216.13 |
| 2009/0315373 A1 | | 12/2009 | Thomas et al. | |
| 2010/0133794 A1 | * | 6/2010 | Tracht et al. | 280/730.2 |
| 2010/0140905 A1 | * | 6/2010 | Kim et al. | 280/730.2 |
| 2011/0095513 A1 | * | 4/2011 | Tracht et al. | 280/730.2 |
| 2011/0278825 A1 | * | 11/2011 | Gumprecht et al. | 280/728.3 |
| 2012/0038131 A1 | * | 2/2012 | Muller et al. | 280/728.2 |
| 2012/0068442 A1 | * | 3/2012 | Wagner | 280/730.2 |
| 2013/0187416 A1 | * | 7/2013 | Nakata | 297/216.13 |

FOREIGN PATENT DOCUMENTS

| | | |
|---|---|---|
| CN | 101258060 | 9/2008 |
| JP | 2002120686 | 4/2002 |

* cited by examiner

*Primary Examiner* — Ruth Ilan
*Assistant Examiner* — Barry Gooden, Jr.
(74) *Attorney, Agent, or Firm* — LeClairRyan

(57) ABSTRACT

A vehicle seat assembly comprises a vehicle seat comprising a rigid frame, one or more resilient portions and a covering material, wherein an openable deployment seam is provided at a portion of the covering material, and wherein the vehicle seat defines a recess. An airbag module is provided within the recess and comprises a housing, an airbag and an inflator system. Also provided is gripping means which is movable between a first position and a second position in which the portion of the covering material is restrained to assist deployment of the airbag through the deployment seam.

13 Claims, 5 Drawing Sheets

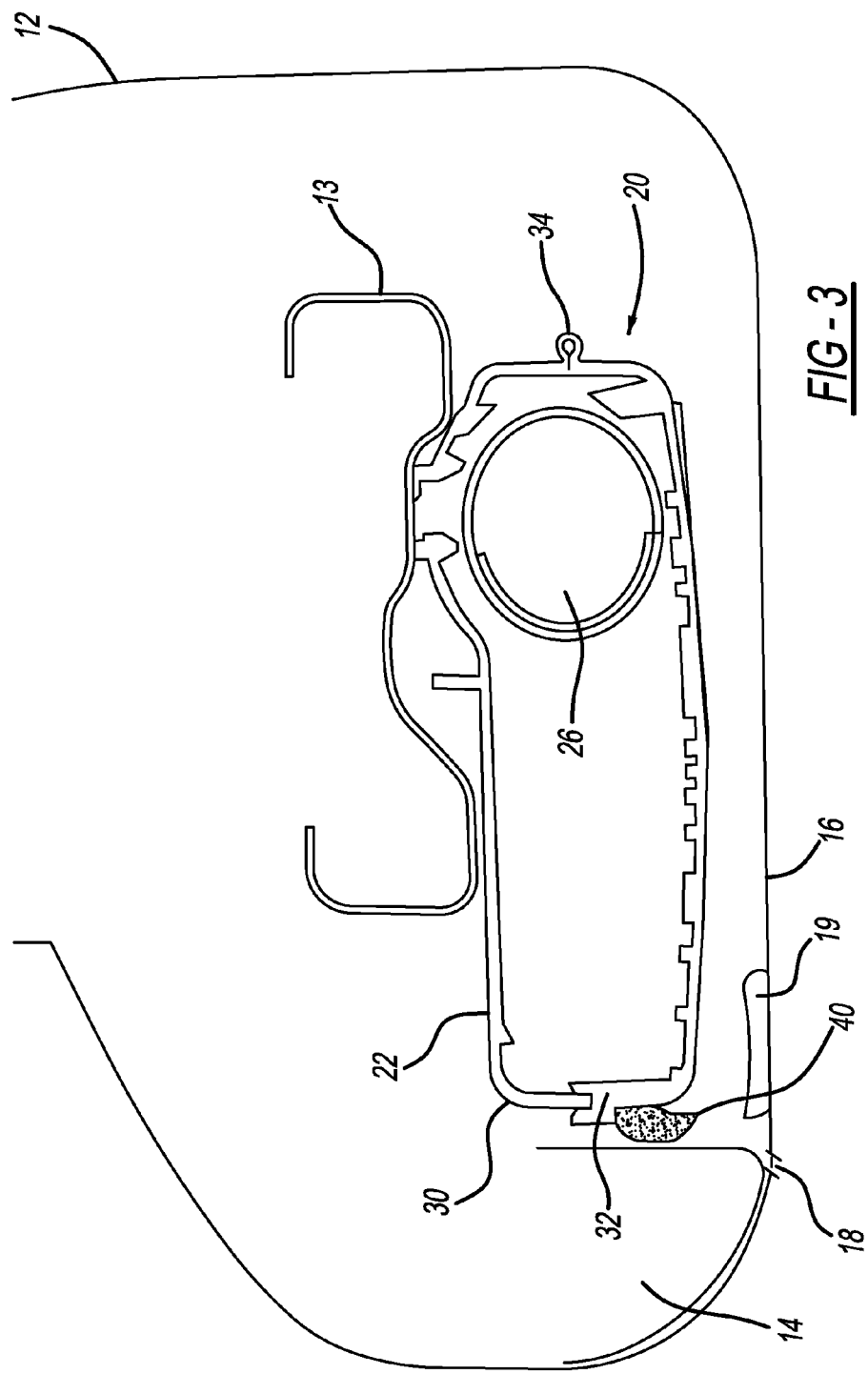

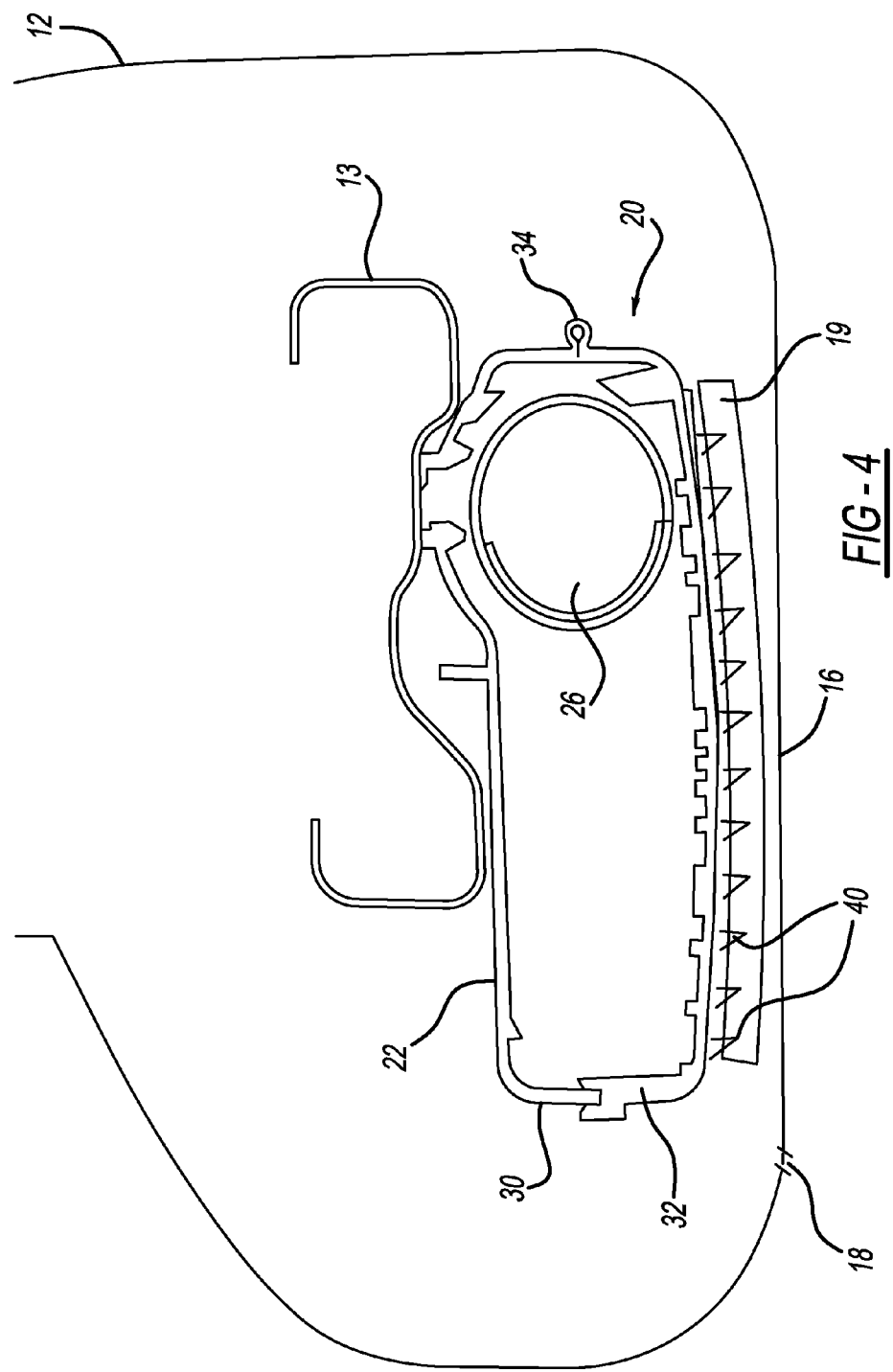

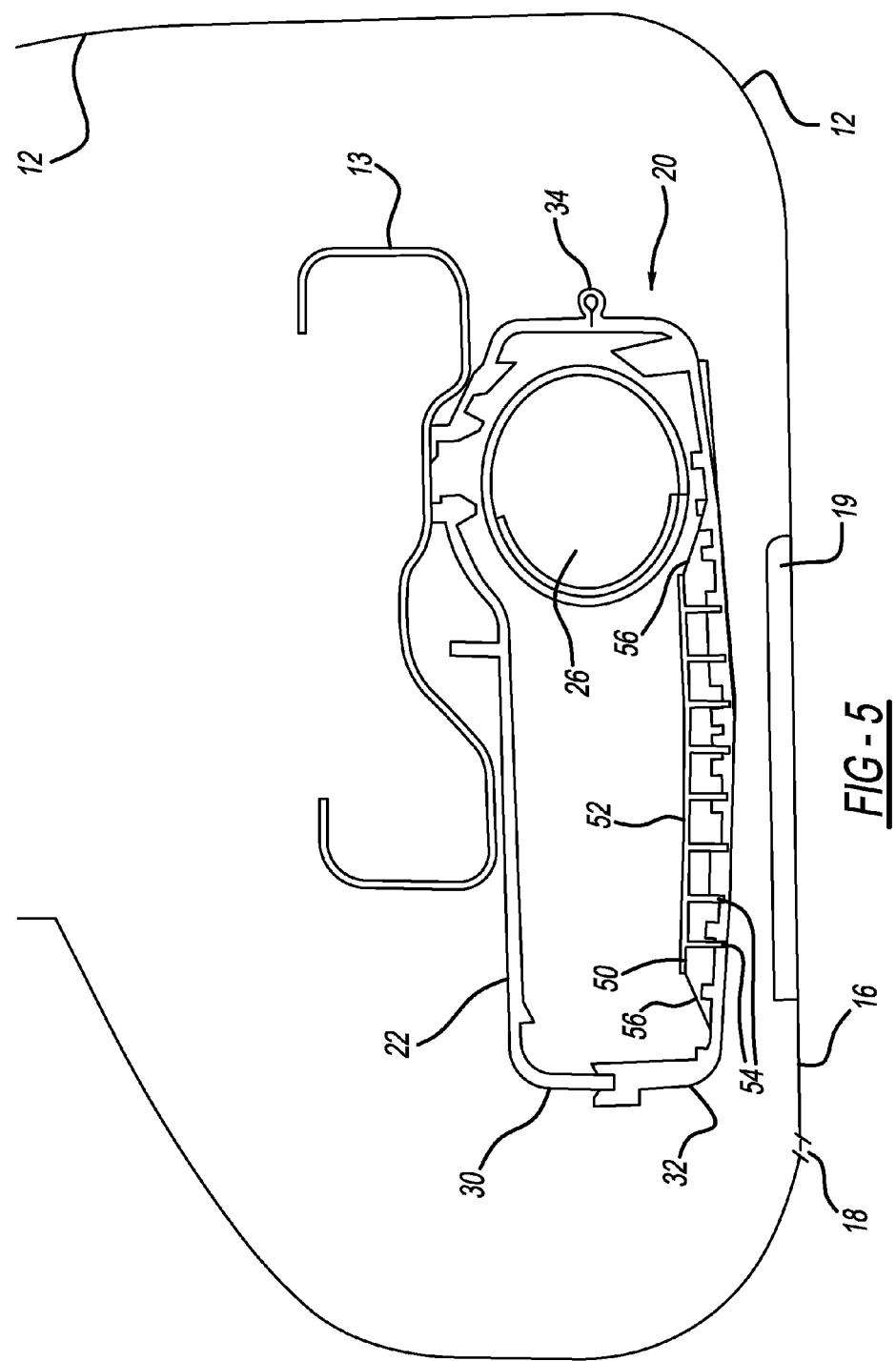

VEHICLE SEAT ASSEMBLY

TECHNICAL FIELD

The present invention relates to a vehicle seat assembly including an airbag. In particular, but not exclusively, the invention relates to a vehicle seat assembly including a side airbag module having means for improved deployment of the airbag.

BACKGROUND OF THE INVENTION

It is known to mount an inflatable side airbag module to a vehicle seat. In the event of an impact, the airbag can be rapidly deployed to a position between the occupant and the adjacent vehicle door or body structure. The side airbag functions to dampen and distribute the impact load to reduce injuries. It is desirable that the airbag is fully deployed within around 20 milliseconds from impact.

The vehicle seat comprises a rigid frame to which foam pads are attached. The seat is covered by a layer of material made of vinyl, cloth or leather. The airbag module is connected to the seat frame and comprises a housing, the airbag and an inflator system.

Typically, the deploying airbag is channelled so that it deploys through a tearable seam in the covering material. However, the elasticity of both the covering material and the foam padding can reduce the rate of airbag deployment. Valuable deployment time is lost as the expanding airbag compresses the foam and stretches the covering material. This may also cause the airbag to deploy to a different location from the desired location.

It is known to use a force concentrator that partially surrounds the folded airbag and directs the force of the inflating airbag towards the deployment seam of the seat. Such a system is disclosed in US 2006/0113766. The force concentrator comprises one or more rigid panels. However, the size and position of the panels complicates assembly and locating the device within the seat.

SUMMARY OF THE INVENTION

According to a first aspect of the present invention there is provided a vehicle seat assembly comprising:

a vehicle seat comprising a rigid frame, one or more resilient portions and a covering material, wherein an openable deployment seam is provided at a portion of the covering material, and wherein the vehicle seat defines a recess;

an airbag module provided within the recess and comprising a housing, an airbag and an inflator system; and gripping means which is movable between a first position and a second position in which the portion of the covering material is restrained to assist deployment of the airbag through the deployment seam.

The gripping means may be movable from the first position to the second position by deployment of the airbag.

The housing may be adapted to expand during deployment of the airbag. A portion of the housing may be adapted to move towards the covering material during deployment of the airbag.

An opening, weakening feature, abutting edges or the like may be provided at the housing such that two portions of the housing move apart during deployment of the airbag. The housing may include a hinge member to assist the two portions moving apart. The hinge member may be provided at an opposite end of the housing to the opening, weakening feature, abutting edges or the like.

The airbag module may be adapted such that the two portions of the housing moving apart during deployment of the airbag causes the gripping means to move from the first position to the second position.

The gripping means may be provided at, or coupled to, an exterior surface of the housing. The gripping means may be provided adjacent to, but spaced apart from, the covering material.

Alternatively or in addition, the gripping means may include a pressure receiving surface provided within the housing. The gripping means may include one or more protrusions extending from the pressure receiving surface, through apertures provided at the exterior surface of the housing and towards the covering material. The airbag module may be adapted such that the pressure receiving surface receives a pressure caused by the inflator system during deployment of the airbag which causes the protrusions to move towards and at least contact the covering material.

The gripping means may include biasing means for biasing the pressure receiving surface towards the first position.

The gripping means may comprise one or more teeth, barbs or hooks. A plurality of teeth, barbs or hooks may be provided, arranged in an array. The number of teeth, barbs or hooks and/or the array configuration may be adapted to spread the gripping force to inhibit tearing of the covering material.

Alternatively, the gripping means may comprise one or more covering material contacting surfaces. Each contacting surface may be adapted to provide frictional contact with the covering material to inhibit relative movement between the contacting surface and the covering material.

The gripping means may be integral with the housing. The housing may be a plastic moulding. The housing may be formed by injection moulding.

Alternatively or in addition, the gripping means may be formed by working of the housing. The gripping means may be formed by deforming one or more portions of the housing to create one or more protrusions.

The gripping means may be adapted to grip the covering material at at least one location adjacent to the deployment seam to reduce elastic stretching of the covering material.

The recess may be provided at a side portion of the vehicle seat to provide a side airbag.

According to a second aspect of the present invention there is provided a method of forming a vehicle seat assembly comprising:

providing a vehicle seat comprising a rigid frame, one or more resilient portions and a covering material;

providing an openable deployment seam at a portion of the covering material;

providing a recess in the vehicle seat;

locating an airbag module within the recess, the module comprising a housing, an airbag and an inflator system; and providing gripping means which is movable between a first position and a second position in which the portion of the covering material is restrained to assist deployment of the airbag through the deployment seam.

The method may include moving the gripping means from the first position to the second position during deployment of the airbag.

The method may include expanding the housing during deployment of the airbag such that a portion of the housing moves towards the covering material.

The method may include providing an opening, weakening feature, abutting edges or the like at the housing such that two portions of the housing move apart during deployment of the airbag.

The method may include providing a pressure receiving surface within the housing. The method may include providing one or more protrusions extending from the pressure receiving surface, through apertures provided at the exterior surface of the housing and towards the covering material. The method may include adapting the pressure receiving surface to receives a pressure caused by the inflator system during deployment of the airbag and to move towards and at least contact the covering material.

The method may include biasing the pressure receiving surface towards the first position.

The gripping means may comprise a plurality of teeth, barbs or hooks and the method may include arranging the plurality of teeth, barbs or hooks in an array so as to spread the gripping force to inhibit tearing of the covering material.

The method may include forming the gripping means as integral with the housing. The housing may be formed by injection moulding.

Alternatively or in addition, the method may include forming the gripping means by working the housing. The method may include deforming one or more portions of the housing to create one or more protrusions.

The method may include providing the recess at a side portion of the vehicle seat to provide a side airbag.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein:

FIG. 3 is a sectional side view of the vehicle seat assembly of FIG. 1;

FIG. 4 is a sectional side view of a second embodiment of a vehicle seat assembly;

FIG. 5 is a sectional side view of a third embodiment of a vehicle seat assembly;

DETAILED DESCRIPTION OF THE PREFERRED EMBODIMENTS

Figure 1:
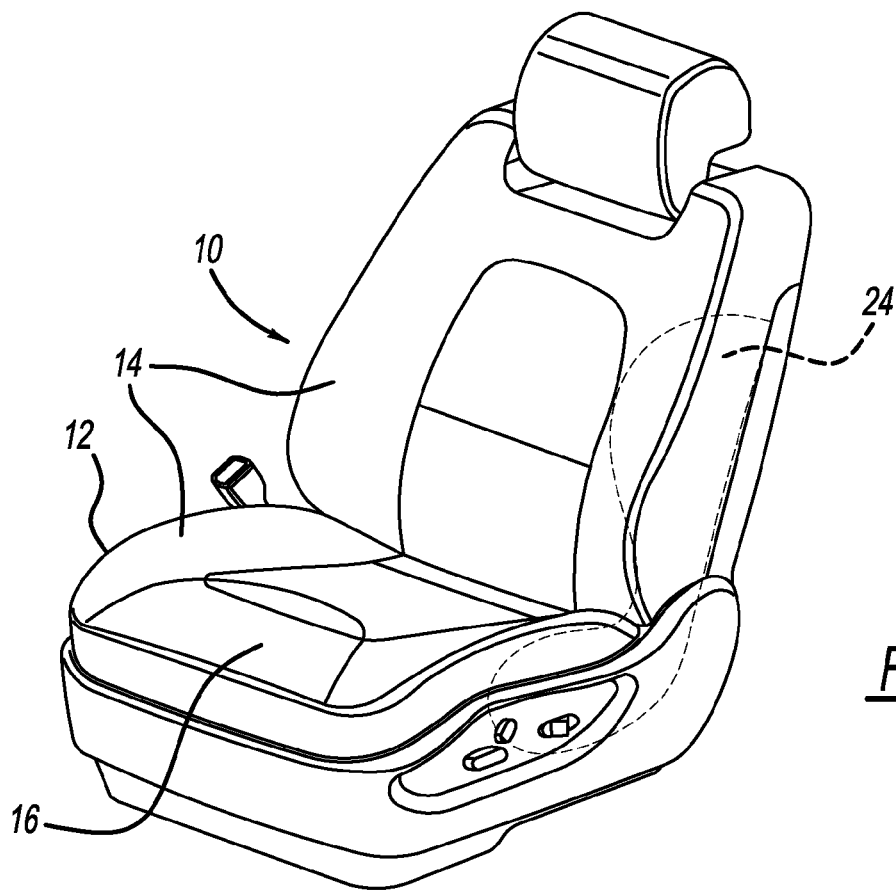
FIG. 1 is a perspective view of a vehicle seat assembly.

In the attached figures the same reference numerals will be used to refer to the same components. In the following description various operating parameters and components are described for different constructed embodiments. These specific parameters and components are included as examples and are not meant to be limiting.

Figure 2:
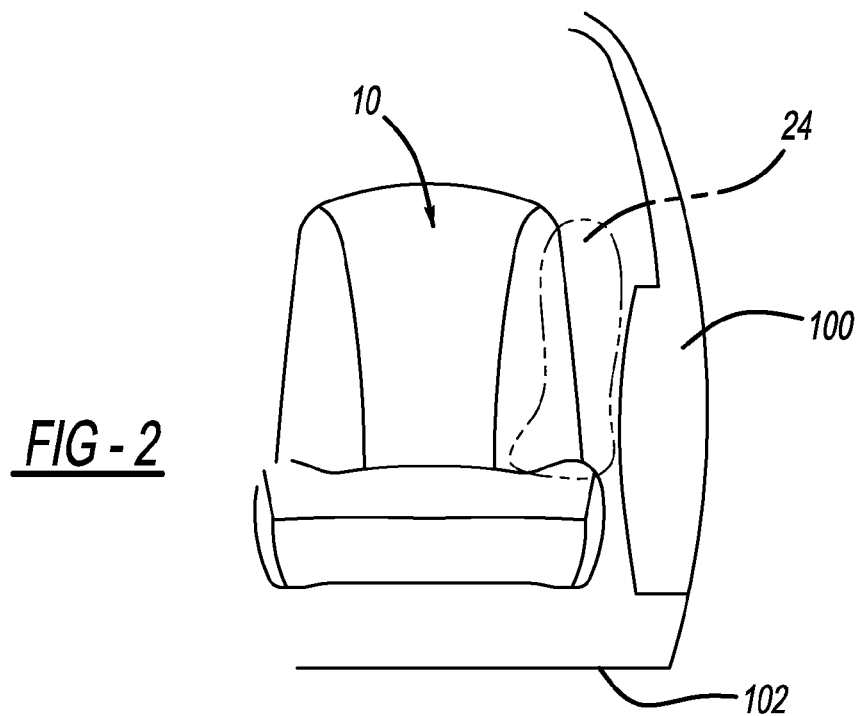
FIG. 2 is a front view of the vehicle seat assembly of FIG. 1 and showing the deployed airbag.

FIGS. 1 and 2 show a vehicle seat assembly 10 which includes a vehicle seat 12. The seat 12 comprises a rigid frame 13 (a portion of which is shown in FIGS. 2 to 5), resilient portions or foam padding 14 and a covering material 16.

As shown in FIGS. 3 to 5, the seat 12 includes a side recess and an airbag module 20 is located within this recess. The airbag module 20 comprises a housing 22, an airbag 24 and an inflator system 26. The airbag module 20 is operable to deploy the airbag 24 to a location between an occupant sitting in the seat 12 and the adjacent body structure 100 of the vehicle 102, as shown in FIGS. 1 and 2.

The covering material 16 includes a deployment seam 18 provided at a portion of the covering material 16, this portion being near to the housing 22. The deployment seam 18 is adapted to predictably tear open when under pressure from the expanding airbag 24. Adjacent to the deployment seam 18 and bonded to the internal surface of the covering material 16 is a piece of foam 19.

The housing 22 comprises an upper portion 30 and a lower portion 32 which move apart during deployment of the airbag 24. The upper portion 30 is fixed to the frame 13. An edge of each portion abut together at one side of the housing At the opposite side, the two portioned are connected by a hinge 34. When the inflator system 26 is initiated, the expanding airbag 24 creates a pressure which forces the two portions apart, allowing the airbag 24 to continue to expand out of the housing 22. The upper portion 30 does not move due to its attachment to the frame 13 but the lower portion 32 pivots outwards about the hinge 34 and therefore towards the covering material 16.

The vehicle seat assembly 10 also includes gripping means. In this embodiment, the gripping means comprises a number of downwardly projecting teeth 40 which are linearly arranged at the housing 22 (only one tooth can be seen in FIG. 3). The housing 22 is a plastic injection moulding and the teeth 40 are formed during the moulding process.

The teeth 40 are provided at the lower portion 32 of the housing 22. Therefore, deployment of the airbag 24 causes the teeth 40 to move from a first position to a second position in which the teeth 40 have moved closer to the covering material 16.

The foam piece 19 is located at the covering material 16 at a position corresponding to the teeth 40 when they have moved closer to the covering material 16.

In use, deployment of the airbag 24 causes the lower portion 32 to pivot outwards as previously described until the teeth 40 pierce into the foam piece 19. This causes the teeth 40, and therefore the housing 22, and the foam piece 19, and therefore the covering material 16, to be attached at this location. Meanwhile, the airbag 24 has expanded out of the housing 22 and is acting on the deployment seam 18. Initially (before a tear stress of the deployment seam 18 is reached), the covering material 16 around the deployment seam 18 responds elastically to this force.

In a conventional arrangement, a substantial amount of covering material 16 would be stretched, elastically absorbing the energy of the airbag 24 for a longer period and delaying the stress at the deployment seam 18 reaching the tear stress. The greater the area of the covering material 16 being stretched, the more elastic absorbing of the energy.

The invention, specifically the attachment of the teeth 40 and foam piece 19, mitigates this. The covering material 16 is restrained at the attachment location which is near the deployment seam 18. Therefore, less covering material 16 is stretched. The tear stress is therefore reached sooner, resulting in the opening of the deployment seam 18 to allow the airbag 24 to exit the seat 12 through the deployment seam 18.

FIG. 4 shows a second embodiment of the invention. Like features are provided with like reference numbers.

This embodiment is similar to the first except that the teeth 40 are arranged in an array comprising two dimensions (only the first row is visible in FIG. 4) at the exterior under-surface of the housing 22. Also, the size and location of the foam piece 19 has been adapted to suit the array of teeth 40.

The greater number of teeth 40 in this embodiment helps to spread the gripping force to inhibit tearing of the covering material 16.

FIG. 5 shows a third embodiment of the invention. Like features are provided with like reference numbers.

In this embodiment, the gripping means comprises a plate 50 having a pressure receiving surface 52. The plate 50 is provided within the housing and so the pressure receiving surface 52 receives a pressure caused by the inflator system during deployment of the airbag 24.

A number of protrusions or pins 54 extend from the plate 50, through apertures provided at the housing 22 and towards the covering material 16. The plate 50 is connected to the housing by springs 56 which bias the plate 50 towards the first position in which the pins 54 are still spaced from the covering material 16.

In use, deployment of the airbag 24 again causes the lower portion 32 to pivot outwards. In addition to this, the plate 50 is moved outwards due to pressure. This combination causes the pins 54 to pierce and attach to the foam piece 19. It is to be appreciated that, in alternative embodiments, only the outwards movement of the plate 50 could be used to cause the pins 54 to pierce and attach to the foam piece 19. For instance, the lower portion 32 of the housing 22 could be attached to the frame 13 and restrained from moving (and the upper portion 30 could move upwards to allow the airbag 24 to exit the housing 22).

Figure 6A:
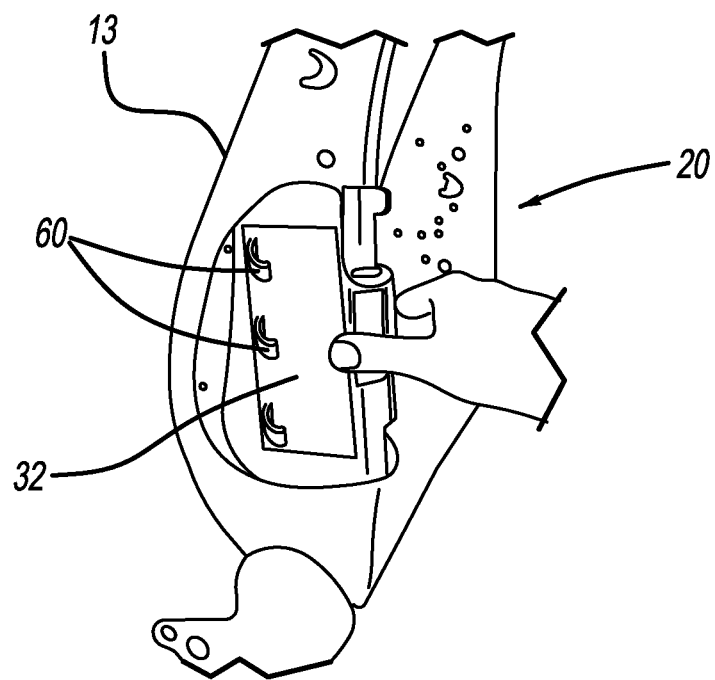
FIG. 6 (*a*) is a perspective view of an airbag module of a fourth embodiment of a vehicle seat assembly, and FIG. 6 (*b*) is a side view of a housing plate of the airbag module.
Figure 6B:
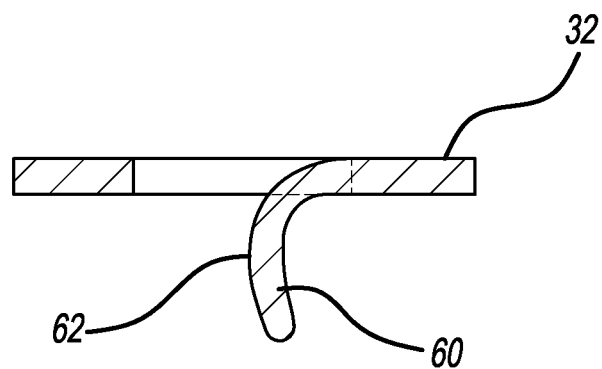

FIG. 6 shows a fourth embodiment of the invention. Like features are provided with like reference numbers.

FIG. 6 (*a*) shows the airbag module 20 attached to the frame 13 of the seat 12. In the figure, the most visible part of the airbag module 20 is the lower portion 32 of the housing 22. In this embodiment, the housing 22 is formed from sheet steel.

The gripping means is formed by working the lower portion 32 of the housing 22. The plane of the sheet steel is cut, for instance using a C cut. Then the material 62 within the cut is deformed out of plane to create a downwardly projecting hook 60, as shown in FIG. 6 (*b*). The end of the hook 60 may be filed to create a sharper profile. This is done at multiple locations to create a row or an array of hooks 60.

The device of this embodiment works similarly to the first and second embodiments. Deployment of the airbag 24 causes the lower portion 32 to pivot outwards. This causes the hooks 60 to pierce and attach to the foam piece 19. This limits stretching of the covering material 16 when acted upon by the expanding the airbag 24.

Whilst specific embodiments of the present invention have been described above, it will be appreciated that departures from the described embodiments may still fall within the scope of the present invention.

The invention claimed is:

1. A vehicle seat assembly comprising:
    a vehicle seat comprising a rigid frame, one or more resilient portions and a covering material, wherein an openable deployment seam is provided at a portion of the covering material, and wherein the vehicle seat defines a recess; and
    an airbag module provided within the recess and comprising a housing, an airbag, an inflator system, and a gripping means movable from a first position to a second position when the airbag is inflated by the inflator system,
        wherein the gripping means includes a pressure receiving surface provided within the housing and one or more protrusions extending from the pressure receiving surface and through apertures provided at an exterior surface of the housing,
        wherein in the first position the gripping means is spaced apart from an inside surface of the covering material, and
        wherein in the second position the gripping means restrains the covering material by moving the one or more protrusions toward the covering material.

2. An assembly as claimed in claim 1, wherein the gripping means is movable from the first position to the second position by deployment of the airbag.

3. An assembly as claimed in claim 1, wherein the gripping means is provided adjacent to, but spaced apart from, the covering material.

4. An assembly as claimed in claim 1, wherein the gripping means includes biasing means for biasing the pressure receiving surface towards the first position.

5. An assembly as claimed in claim 1, wherein the gripping means comprises one or more teeth arranged in an array.

6. An assembly as claimed in claim 1, wherein the gripping means comprises;
    one or more projections extending from the housing and spaced apart from the inside surface of the covering material in the first position, and
    a foam piece bonded to the inside surface of the covering material, wherein in the second position the one or more projections engage the foam pad to restrain the covering material.

7. An assembly as claimed in claim 1, wherein the gripping means is adapted to grip the covering material in at least one location adjacent to the deployment seam to reduce elastic stretching of the covering material.

8. An assembly as claimed in claim 1, wherein the housing is adapted to expand during deployment of the airbag.

9. An assembly as claimed in claim 8, wherein a portion of the housing is adapted to move towards the covering material during the deployment of the airbag.

10. An assembly as claimed in claim 8, wherein an opening, weakening feature, or abutting edges are provided at the housing such that two portions of the housing move apart during the deployment of the airbag and wherein the housing includes a hinge member to assist the two portions moving apart.

11. An assembly as claimed in claim 10, wherein the airbag module is adapted such that the two portions of the housing moving apart during the deployment of the airbag causes the gripping means to move from the first position to the second position.

12. A vehicle seat assembly comprising:
    a vehicle seat comprising a rigid frame, one or more resilient portions, a covering material, and a foam piece bonded to an internal surface of the covering material, wherein an openable seam is provided at a portion of the covering material, and wherein the vehicle seat defines a recess; and
    an airbag module provided within the recess and comprising a housing, an airbag, an inflator system, and an array of one or more teeth that extends from the housing and that is movable from a first position to a second position when the airbag is inflated by the inflator system,
        wherein in the first position the array of one or more teeth is spaced apart from the internal surface of the covering material, and
        wherein in the second position the array of one or more teeth engages the foam piece when the array of one or more teeth is moved toward the internal surface.

13. The vehicle seat assembly of claim 12, wherein the array of one or more teeth are co-molded with the housing.

\* \* \* \* \*